United States Patent
Olsen et al.

(10) Patent No.: US 7,331,421 B2
(45) Date of Patent: Feb. 19, 2008

(54) FLOW RESTRICTORS FOR AIRCRAFT INLET ACOUSTIC TREATMENTS, AND ASSOCIATED SYSTEMS AND METHODS

(75) Inventors: Ronald F. Olsen, Seattle, WA (US); Marlin D. Breer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 11/094,916

(22) Filed: Mar. 30, 2005

(65) Prior Publication Data

US 2006/0219475 A1 Oct. 5, 2006

(51) Int. Cl.
*F01N 3/038* (2006.01)
*B64D 33/02* (2006.01)

(52) U.S. Cl. .................. 181/214; 181/221; 244/1 N; 244/53 B; 60/39.092

(58) Field of Classification Search .......... 181/214, 181/220, 221, 292; 244/1 N, 53 B, 134 R, 244/134 E, 134 F, 134 B; 415/119; 60/779, 60/39.093, 39.092
See application file for complete search history.

(56) References Cited

U.S. PATENT DOCUMENTS

| | | |
|---|---|---|
| 1,616,008 A | 2/1927 | Stout |
| 1,835,370 A | 12/1931 | Gellanca |
| 2,240,310 A | 4/1941 | McKay |
| 2,387,708 A | 10/1945 | Arhym |
| 2,755,456 A | 7/1956 | Bursack |
| 2,850,083 A | 9/1958 | Frost |
| 2,970,475 A | 2/1961 | Werner |
| 3,000,213 A | 9/1961 | Eves et al. |
| 3,057,198 A | 10/1962 | Crouchman |
| 3,096,054 A | 7/1963 | Ciminaghi |
| 3,097,982 A | 7/1963 | Stoner |
| 3,117,751 A * | 1/1964 | Rogers et al. ............ 244/209 |

(Continued)

FOREIGN PATENT DOCUMENTS

DE      1 095 131      12/1960

(Continued)

OTHER PUBLICATIONS

AC TECH—Locations Page, Advanced Chemistry & Technology, © AC TECH, Inc. 2000 (4 pages); http://www.actechaero.com/index7.html; [Accessed Oct. 9, 2002].

(Continued)

*Primary Examiner*—Edgardo San Martin
(74) *Attorney, Agent, or Firm*—Perkins Coie LLP

(57) ABSTRACT

Flow restrictors for aircraft inlet acoustic cores, and associated systems and methods are disclosed. A system in accordance with one embodiment of the invention includes an inlet flow surface having multiple openings, and an acoustic treatment positioned adjacent to the inlet flow surface. The acoustic treatment can have multiple cells in fluid communication with the openings in the inlet flow surface. A fluid collector passage can be positioned to collect liquid entering the acoustic treatment through the multiple openings, and can have an exit aperture through which the liquid drains. The fluid collector passage can include at least one flow restrictor positioned to at least restrict the flow of air from the exit aperture through the fluid collector passage to the multiple openings.

22 Claims, 4 Drawing Sheets

U.S. PATENT DOCUMENTS

| | | |
|---|---|---|
| 3,145,000 A | 8/1964 | Mackie |
| 3,201,990 A | 8/1965 | Wald |
| 3,236,093 A | 2/1966 | Werner |
| 3,276,254 A | 10/1966 | Richard |
| 3,287,974 A | 11/1966 | Ciemonchowski |
| 3,466,220 A | 9/1969 | Allinikov et al. |
| 3,493,450 A | 2/1970 | Judge, Jr. |
| 3,516,895 A * | 6/1970 | Hartman ............... 428/116 |
| 3,542,152 A * | 11/1970 | Oxx, Jr. et al. ............ 181/214 |
| 3,612,173 A | 10/1971 | Goyal |
| 3,697,726 A | 10/1972 | Geronime |
| 3,798,971 A | 3/1974 | Lowrance |
| 3,820,628 A | 6/1974 | Hanson |
| 3,821,999 A | 7/1974 | Guess et al. |
| 3,910,374 A | 10/1975 | Holehouse |
| 3,917,193 A | 11/1975 | Runnels, Jr. |
| 3,921,480 A | 11/1975 | Ball |
| 3,933,327 A | 1/1976 | Cook et al. |
| 3,940,622 A | 2/1976 | Stallabrass et al. |
| 3,948,346 A | 4/1976 | Schindler |
| 3,976,270 A | 8/1976 | Catchpole |
| 4,032,090 A | 6/1977 | Thornton-Trump |
| 4,035,535 A | 7/1977 | Taylor |
| 4,129,993 A | 12/1978 | Schotten |
| 4,152,938 A | 5/1979 | Danninger |
| 4,210,021 A | 7/1980 | Vykhodtsev et al. |
| 4,222,044 A | 9/1980 | Boschung |
| 4,284,443 A | 8/1981 | Hilton |
| 4,293,053 A * | 10/1981 | Shuttleworth et al. ...... 181/213 |
| 4,304,376 A | 12/1981 | Hilton |
| 4,384,634 A * | 5/1983 | Shuttleworth et al. ...... 181/213 |
| 4,393,692 A | 7/1983 | Clark et al. |
| 4,403,872 A | 9/1983 | DeLeo |
| 4,475,624 A | 10/1984 | Bourland, Jr. et al. |
| 4,482,114 A | 11/1984 | Gupta et al. |
| 4,508,295 A | 4/1985 | Cattaneo et al. |
| 4,522,859 A | 6/1985 | Blair |
| 4,611,492 A | 9/1986 | Koosmann |
| 4,674,714 A | 6/1987 | Cole et al. |
| 4,688,745 A | 8/1987 | Rosenthal |
| 4,733,834 A | 3/1988 | Phillips, II |
| 4,738,416 A | 4/1988 | Birbragher |
| 4,743,740 A | 5/1988 | Adee |
| 4,749,150 A | 6/1988 | Rose et al. |
| 4,752,049 A | 6/1988 | Cole |
| 4,757,963 A | 7/1988 | Cole |
| 4,759,513 A | 7/1988 | Birbragher |
| 4,803,108 A | 2/1989 | Leuchten |
| 4,808,009 A | 2/1989 | Sittler et al. |
| 4,850,093 A | 7/1989 | Parente |
| 4,890,494 A | 1/1990 | Osbond et al. |
| 4,907,449 A | 3/1990 | Call et al. |
| 4,908,599 A | 3/1990 | Breen et al. |
| 4,925,721 A | 5/1990 | Harper-Tervet et al. |
| 4,926,633 A * | 5/1990 | Nash et al. ............... 60/226.1 |
| 4,926,963 A | 5/1990 | Snyder |
| 4,980,673 A | 12/1990 | Kleven |
| 5,003,295 A | 3/1991 | Kleven |
| 5,006,391 A | 4/1991 | Biersach |
| 5,011,098 A | 4/1991 | McLaren et al. |
| 5,025,888 A | 6/1991 | Arcas et al. |
| 5,041,323 A | 8/1991 | Rose et al. |
| 5,041,324 A | 8/1991 | Siegling et al. |
| 5,043,558 A | 8/1991 | Byles |
| 5,088,277 A | 2/1992 | Schulze |
| 5,088,660 A * | 2/1992 | Karanian ............... 244/53 B |
| 5,114,100 A | 5/1992 | Rudolph et al. |
| 5,140,135 A | 8/1992 | Freeman |
| 5,220,785 A * | 6/1993 | Miller ............... 60/39.093 |
| 5,243,185 A | 9/1993 | Blackwood |
| 5,257,498 A | 11/1993 | Nikkanen et al. |
| 5,313,202 A | 5/1994 | Hansman, Jr. et al. |
| 5,354,015 A | 10/1994 | Meador |
| 5,365,731 A | 11/1994 | Nikkanen et al. |
| 5,398,547 A | 3/1995 | Gerardi et al. |
| 5,400,984 A | 3/1995 | Arnold et al. |
| 5,415,522 A | 5/1995 | Pla et al. |
| 5,423,658 A | 6/1995 | Pla et al. |
| 5,484,121 A | 1/1996 | Padawer et al. |
| 5,488,375 A | 1/1996 | Michie |
| 5,498,127 A | 3/1996 | Kraft et al. |
| 5,551,288 A | 9/1996 | Geraldi et al. |
| 5,575,440 A | 11/1996 | LeBlond et al. |
| 5,590,849 A | 1/1997 | Pla |
| 5,616,861 A | 4/1997 | Hagen |
| 5,619,144 A | 4/1997 | Stormbom |
| 5,628,565 A | 5/1997 | Hagen et al. |
| 5,644,080 A | 7/1997 | Stormbom et al. |
| 5,650,610 A | 7/1997 | Gagnon |
| 5,653,538 A | 8/1997 | Phillips |
| 5,683,062 A | 11/1997 | Spiro et al. |
| 5,702,231 A | 12/1997 | Dougherty |
| 5,748,091 A | 5/1998 | Kim |
| 5,752,674 A | 5/1998 | Mears et al. |
| 5,763,858 A | 6/1998 | Jones |
| 5,776,579 A | 7/1998 | Jessup et al. |
| 5,777,481 A | 7/1998 | Vivekanandan |
| 5,814,137 A | 9/1998 | Blohowiak et al. |
| 5,841,079 A | 11/1998 | Parente |
| 5,849,110 A | 12/1998 | Blohowiak et al. |
| 5,869,140 A | 2/1999 | Blohowiak et al. |
| 5,869,141 A | 2/1999 | Blohowiak et al. |
| 5,874,672 A | 2/1999 | Gerardi et al. |
| RE36,215 E | 6/1999 | Rosenthal |
| 5,934,611 A * | 8/1999 | Tindell et al. ............ 244/53 B |
| 5,934,617 A | 8/1999 | Rutherford |
| 5,939,197 A | 8/1999 | Blohowiak et al. |
| 5,965,814 A | 10/1999 | French et al. |
| 6,037,060 A | 3/2000 | Blohowiak et al. |
| 6,049,282 A | 4/2000 | MacKenzie |
| 6,070,475 A | 6/2000 | Muehlhauser et al. |
| 6,140,942 A | 10/2000 | Bragg |
| 6,155,060 A | 12/2000 | Parkman |
| 6,194,685 B1 | 2/2001 | Rutherford |
| 6,211,494 B1 | 4/2001 | Giamati et al. |
| 6,237,874 B1 | 5/2001 | Rutherford et al. |
| 6,247,669 B1 | 6/2001 | Rauckhorst, III et al. |
| 6,250,801 B1 | 6/2001 | Bernard |
| 6,263,680 B1 | 7/2001 | Newman et al. |
| 6,263,690 B1 | 7/2001 | Sokolean et al. |
| 6,269,320 B1 | 7/2001 | Otto |
| 6,304,194 B1 | 10/2001 | McKillip |
| 6,320,511 B1 | 11/2001 | Cronin et al. |
| 6,328,467 B1 | 12/2001 | Keyhani |
| 6,347,767 B1 | 2/2002 | Holmen |
| 6,367,268 B1 | 4/2002 | Paul |
| 6,370,450 B1 | 4/2002 | Kromer et al. |
| 6,371,411 B1 | 4/2002 | Breer et al. |
| 6,430,996 B1 | 8/2002 | Anderson et al. |
| 6,434,504 B1 | 8/2002 | Eryurek et al. |
| 6,449,574 B1 | 9/2002 | Eryurek et al. |
| 6,457,676 B1 | 10/2002 | Breer et al. |
| 6,460,359 B1 | 10/2002 | Lauwers |
| 6,467,730 B2 * | 10/2002 | Laugt ............... 244/134 B |
| 6,468,360 B1 | 10/2002 | Andrews |
| 6,490,876 B2 | 12/2002 | Derryberry et al. |
| 6,519,546 B1 | 2/2003 | Eryurek et al. |
| 6,581,391 B2 | 6/2003 | Horey et al. |
| 6,592,963 B1 | 7/2003 | Levit |
| 6,609,592 B2 | 8/2003 | Wilson |
| 6,609,825 B2 | 8/2003 | Ice et al. |
| 6,631,638 B2 | 10/2003 | James et al. |
| 6,688,558 B2 | 2/2004 | Breer et al. |
| 6,736,354 B2 | 5/2004 | Goto et al. |

| | | |
|---|---|---|
| 6,767,129 B2 | 7/2004 | Lee et al. |
| 6,813,020 B2 | 11/2004 | Roques et al. |
| 6,827,180 B2 | 12/2004 | Wilson |
| 6,827,485 B2 | 12/2004 | Isebrand |
| 6,868,721 B2 | 3/2005 | Szilder et al. |
| 6,905,242 B2 | 6/2005 | Heuer et al. |
| 6,910,659 B2 | 6/2005 | Friddell et al. |
| 7,014,357 B2 | 3/2006 | Severson |
| 7,014,359 B2 | 3/2006 | Suga et al. |
| 7,056,013 B2 | 6/2006 | Anderson et al. |
| 7,090,167 B2 | 8/2006 | Friddell et al. |
| 2004/0075027 A1 | 4/2004 | Friddell et al. |
| 2004/0206854 A1 | 10/2004 | Shah et al. |
| 2005/0276696 A1 | 12/2005 | LeMieux |

FOREIGN PATENT DOCUMENTS

| | | |
|---|---|---|
| DE | 3506317 C1 | 2/1986 |
| EP | 0 509 166 A1 | 10/1992 |
| EP | 0 893 342 | 1/1999 |
| GB | 609314 | 9/1945 |
| GB | 674 750 | 7/1952 |
| GB | 2 158 939 | 11/1985 |
| GB | 2 283 315 | 5/1995 |
| WO | WO-81/01331 | 5/1981 |
| WO | WO-2004/110865 A1 | 12/2004 |
| WO | WO-2005/020175 A1 | 3/2005 |

OTHER PUBLICATIONS

Advanced Chemistry & Technology, AC™-130, Surface Preparation for Bonding (2 page).

Aeronca Inc., Magellan Aerospace Corporation, Brazed Structures, © 2000-02 Magellan Aerospace Corporation (2 pages), http://www.aeroncainc.vom/aeronca_bs.html [Accessed Oct. 8, 2002].

ALCORE, Trussgrid—Three Dimensional Honeycomb, © 1999 Alcore, Inc. (2 pages).

Cytec—Product Information, Cytec—Aerospace and Engineered Materials (3 pages); http://www.cytec.com/products4/aerospacemenu.html [Accessed Oct. 8, 2002].

Dean, P. D., "On the 'In-Situ' Control of Acoustic Liner Attenuation," Journal of Engineering for Power, Jan. 1977, pp. 63-70.

Goodrich Aerostructures Group, Advanced Processes, © 2001, 2002 Goodrich Corporation, (1 page); http://www.rohr.com/html/rd_advanced.html [Accessed Oct. 8, 2002].

Metallic Honeycomb (3 pages), http://www.honeycombone.com/metallic.htm [Accessed Oct. 8, 2002].

Schwartz, Jody, "Keep on Truckin': SIA Adhesives, a Sovereign Speciality Chemicals Subsidiary, Provides the Bond for General Motors' New Composite Truck Box," Adhesives Age, Oct. 5, 2000 (2 pages).

Torayca Prepreg Products, "Toray" (3 pages); http://www.torayusa.com/tca/products/prepreg.htm [Accessed Oct. 8, 2002].

"Aerospace Standard SAE As 8181," Issue Aug. 1997, Society of Automotive Engineers Inc.

"AIAA-2001-0398 Certification and Integration Aspects of a Primary Ice Detection System," 39th Aerospace Sciences Meeting and Exhibit, Jan. 8-11, 2001.

"AIAA-2001-0679 Ludlan Limit Considerations on Cylinder Ice Accretion: Aerodynamics and Thermodynamics," 39th Aerospace Sciences Meeting & Exhibit, Jan. 8-11, 2001.

Elliot Aviation, "New System Warns King Air Pilots of Inflight Icing," Wavelink News Magazine, Wavelink Articles, 2 pages, www.elliottaviation.com/wavelink/1998q2/wavart03A.asp <http://www.elliottaviation.com/wavelink/1998q2/wavart03A.asp> [accessed Nov. 20, 2002].

Goodrich Corporation, Sensor Systems, Model 101 and 102, Total Temperature Sensors, Measuring Total Temperature, www.aerospace.goodrich.com, 8 pages, Burnsville, MN, USA.

Goodrich Corporation, Sensor Systems, Model 102LJ2AG, Total Temperature Sensor, www.aerospace.goodrich.com, 2 pages, Burnsville, MN, USA.

Goodrich Corporation, Sensor, Systems, Total Temperature Sensors, Technical Report 5755, www.aerospace.goodrich.com, 32 pages, Burnsville, MN, USA.

Hwang, D.P., "A Proof of Concept Experiment for Reducing Skin Friction By Using a Micro-Blowing Technique", NASA Technical Memorandum 107315, AIAA-97-0546, 35th Aerospace Sciences Meeting and Exhibit, American Institute of Aeronautics and Astronautics, Reno, Nevada, Jan. 6-9, 1997 (13 Pages).

Ingard, U. et al., "Acoustic Nonlinearity of an Orifice," The Journal of the Acoustical Society of America, vol. 42, No. 1, 1967, pp. 6-17.

Kim, J.J., "Heat Transfer Model of a Jet Pump Cowl Anti-Ice System," 1996 World Aviation Congress, SAE International and American Institute of Aeronautics and Astronautics, Los Angeles, California, Oct. 21-24, 1996, pp. 1-15.

Noca, F. et al., "Aircraft Mounted Cloud Water Content Probe," New Technology Report, Center for Space Microelectronics Technology, Jet Propulsion Laboratory, 13 pages, Pasadena, California.

SEA International, "Aircraft Ice Detectors and Icing Rate Measuring Instruments," SEA AIR4367, Aerospace Information Report, Issued Apr. 1994, Society of Auomotive Engineers, Inc., USA.

Volvo, "Volvo S70 & V70 Manual," Volvo Car Corporation, 1998, Goteborg, Sweden (3 Pages).

"In Flight Icing", RAP Annual Scientific Report 2003, www.rap.ucar.edu, Feb. 6, 2004, p. 1-11.

\* cited by examiner

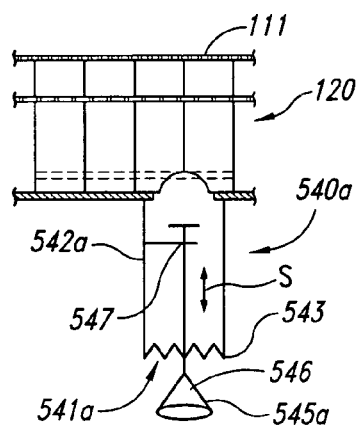
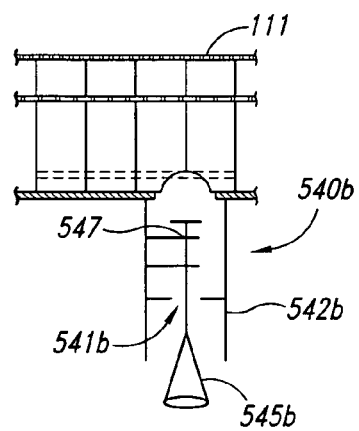
Fig. 5A    Fig. 5B
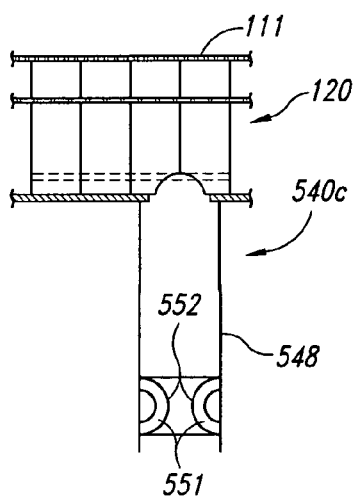
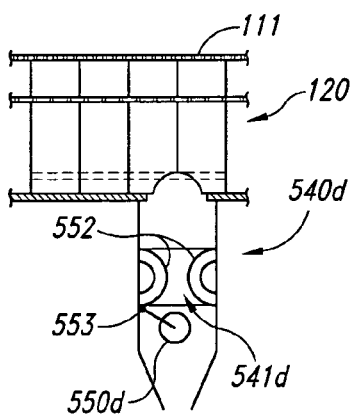
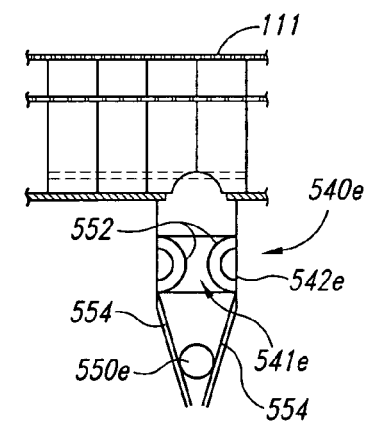
Fig. 5C    Fig. 5D    Fig. 5E
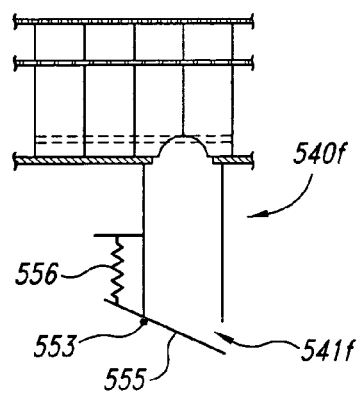
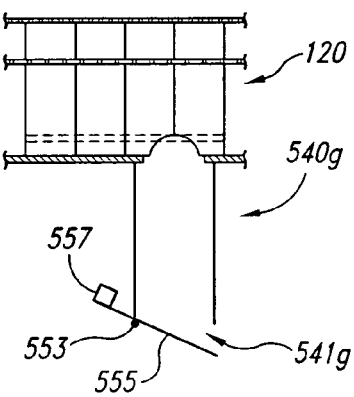
Fig. 5F    Fig. 5G

FLOW RESTRICTORS FOR AIRCRAFT INLET ACOUSTIC TREATMENTS, AND ASSOCIATED SYSTEMS AND METHODS

TECHNICAL FIELD

The present invention is directed generally toward flow restrictors for aircraft inlet acoustic treatments, and associated systems and methods.

BACKGROUND

Many commercial jet aircraft are subject to governmental regulations that limit the permissible noise levels generated by the aircraft near airports. One source of noise from jet aircraft is engine noise that propagates forward from the engine through the air intake or inlet. One method for attenuating inlet noise is to line the inlet with an acoustic liner that includes a honeycomb core sandwiched between a perforated front sheet and a solid back sheet. Accordingly, each cell of the honeycomb core has an opening at the front sheet that defines a Helmholtz resonator. The perforated front sheet is aligned with the inlet flow so that the sound waves in the inlet pass through the front sheet and into the honeycomb core where they are dissipated. The acoustic liner typically extends along the inner surface of the inlet to the engine.

One problem associated with the acoustic core is that it can collect water and water vapor through the perforated front sheet. Water in the acoustic core can freeze and expand (e.g., when the core cools down as the aircraft gains altitude), causing the acoustic core to delaminate or otherwise undergo structural failure. One approach for addressing this problem is to provide the acoustic core with a series of internal channels that collect the water and drain the water through one or more drain holes. However, the drain holes themselves can create additional problems. For example, during some flight (and/or ground operation) conditions, the pressure at the perforated front sheet is less than the pressure at the drain holes. As a result, air tends to get sucked into the acoustic core through the drain holes. From the acoustic core, this air transpires out through the perforated front sheet, where it can disrupt the main air flow through the inlet, particularly at high inlet angles of attack and/or high cross-wind conditions and/or high engine power settings. The disruption in inlet air flow can in turn reduce engine performance, resulting in inefficient aircraft operation.

The foregoing transpiration air flow problem is exacerbated as the amount of acoustic treatment provided in the inlet increases in response to environmental and regulatory pressures to further reduce aircraft inlet noise. For example, the acoustic treatment has typically been placed close to the engine fan, but, in an effort to further reduce inlet noise, recent installations include extending the acoustic treatment forward from the fan up to and forward of the inlet throat. The air pressure at the inlet throat is typically lower than anywhere else in the inlet, which can further increase the tendency for transpiration flow to enter the inlet through the drain holes and the acoustic core.

To address the increased tendency for transpiration flow to enter the inlet, one approach has been to cover the perforations in the face sheet near the locations of the drain holes. This has the effect of reducing the amount of transpiration flow that can pass directly from the drain holes through the acoustic core and into the inlet flow field via the perforated face sheet. However, this approach suffers from several drawbacks. One such drawback is that blocking the perforated face sheet in selected regions reduces the overall effectiveness of the acoustic treatment, and therefore reduces the noise attenuation provided by the acoustic core. Another drawback is that blocking selected portions of the perforated face sheet adds to the complexity of manufacturing the inlet because the acoustic treatment is no longer uniform. For example, special care must be taken to align unperforated sections of the face sheet with the drain holes, and ensure that perforated sections of the face sheet are not aligned with the drain holes. As a result, the cost of manufacturing the inlet can be undesirably increased.

SUMMARY

The following summary is provided for the benefit of the reader only, and does not limit the invention as set forth by the claims. Aspects of the invention are directed to an aircraft inlet system that includes an inlet flow surface having multiple openings, and an acoustic treatment positioned adjacent to the inlet flow surface. The acoustic treatment can have multiple cells in fluid communication with the openings in the inlet flow surface. A fluid collector passage can be positioned to collect liquid entering the acoustic treatment through the multiple openings. The fluid collector passage can have an exit aperture through which the liquid drains, and can include at least one flow restrictor positioned to at least restrict a flow of air from the exit aperture through the fluid collector passage to the multiple openings.

In particular aspects of the invention, the flow restrictor can have a generally fixed geometry, for example, a tapered or conical shape. In other aspects of the invention, at least a portion of the flow restrictor can be changeable between a first configuration in which the flow of air is restricted at a first level, and a second configuration in which the flow of air is unrestricted or restricted at a second level less than the first level. For example, the flow restrictor can include a pivotable or slideable element that moves to restrict air flow through the acoustic treatment in response to a reduced pressure level at the inlet flow surface. The flow restrictor can also include features that reduce the effects of liquid surface tension in the flow restrictor. For example, the exit opening at the flow restrictor can have a serrated edge.

Other aspects of the invention are directed to methods for operating an aircraft inlet. One such method includes drawing air through an aircraft inlet to an aircraft engine and then attenuating noise in the inlet by allowing acoustic signals to pass through apertures in a surface of the inlet to an acoustic treatment. Moisture can be collected from the acoustic treatment in a fluid passage and can be removed through an exit aperture of the fluid passage. The method can further include at least restricting a flow of air from the exit aperture through the fluid passage and into the inlet through the inlet surface apertures. The flow of air can be restricted with a flow restrictor having a generally fixed geometry, and/or a flow restrictor that is changeable from a first configuration to a second configuration. In particular aspects of the invention, the method can include providing a greater resistance to the flow of air proximate to the exit aperture than at any other point along the flow passage between the exit aperture and the inlet flow surface.

BRIEF DESCRIPTION OF THE DRAWINGS

FIGS. 5A-5G illustrate flow restrictors having moving components in accordance with still further embodiments of the invention.

DETAILED DESCRIPTION

The present disclosure describes flow restrictors for aircraft inlet acoustic cores, liners and/or other acoustic treatments, and associated systems and methods. Many specific details of certain embodiments of the invention are set forth in the following description and in FIGS. 1-5G to provide a thorough understanding of these embodiments. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
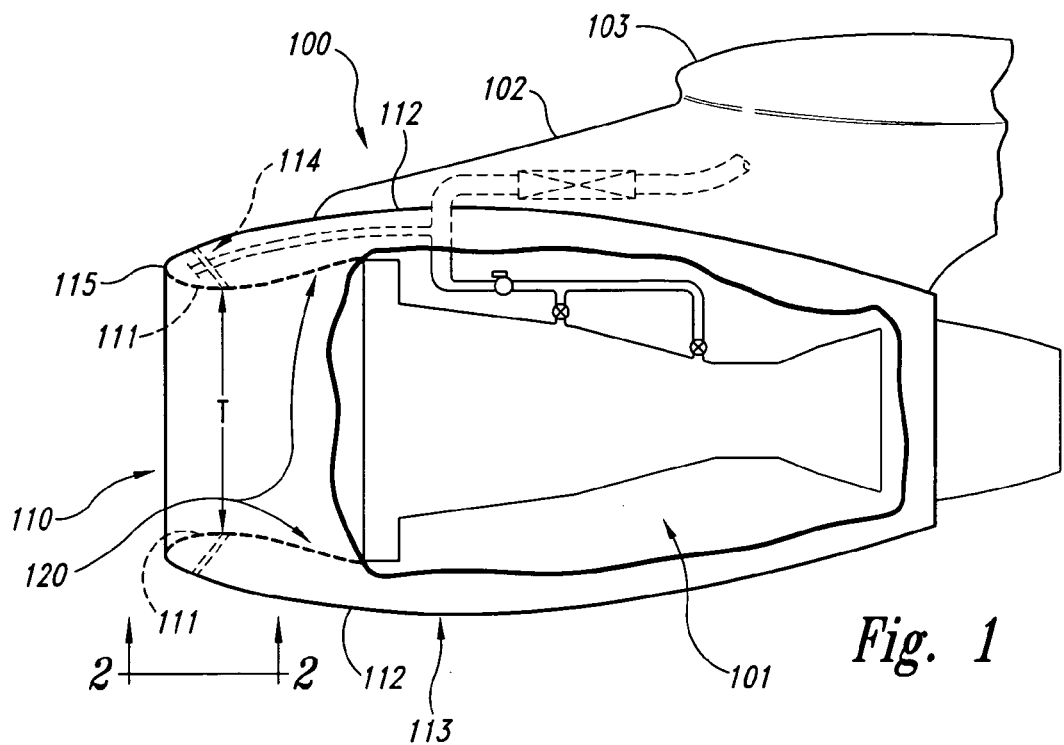
FIG. 1 is a partially cutaway, schematic illustration of an aircraft inlet having an acoustic core configured in accordance with an embodiment of the invention.

FIG. 1 is a partially cutaway, schematic illustration of a propulsion system 100 that includes an inlet 110 acoustically treated in accordance with an embodiment of the invention. The propulsion system 100 includes a turbine engine 101 housed in a nacelle 113 that is in turn secured to a wing 103 with a strut 102. The nacelle 113 includes the inlet 110, which supplies air to the turbine engine 101. The inlet 110 is typically configured to have a low external drag and internal drag. Accordingly, the inlet 110 can include a smoothly contoured external surface 112, and a smoothly contoured inlet flow surface 111. These two surfaces define a leading edge or hilite 115 at the forward-most point of the inlet 110, and the inlet flow surface 111 defines a minimum inlet flow area or throat "T" aft of the hilite 115.

The inlet flow surface 111 can include an acoustic treatment, e.g., a core or liner 120 that provides for attenuation of noise generated by the propulsion system 100. As used herein, the phrase "acoustic treatment" refers generally to a structure, assembly and/or system that provides sound attenuation. In several embodiments, the acoustic treatment can include the sound-attenuating core 120 positioned adjacent to the inlet flow surface 111. The core 120 can in some cases be integrated with an ice protection system 114 that protects the inlet flow surface 111 from ice formation. The core 120 can also include provisions for preventing the internal accumulation of water (and/or other liquids), while also preventing or at least restricting transpiration air flow out through the inlet flow surface 111 via the core 120. Further details of these capabilities are described below with reference to FIGS. 2-5G.

Figure 2:
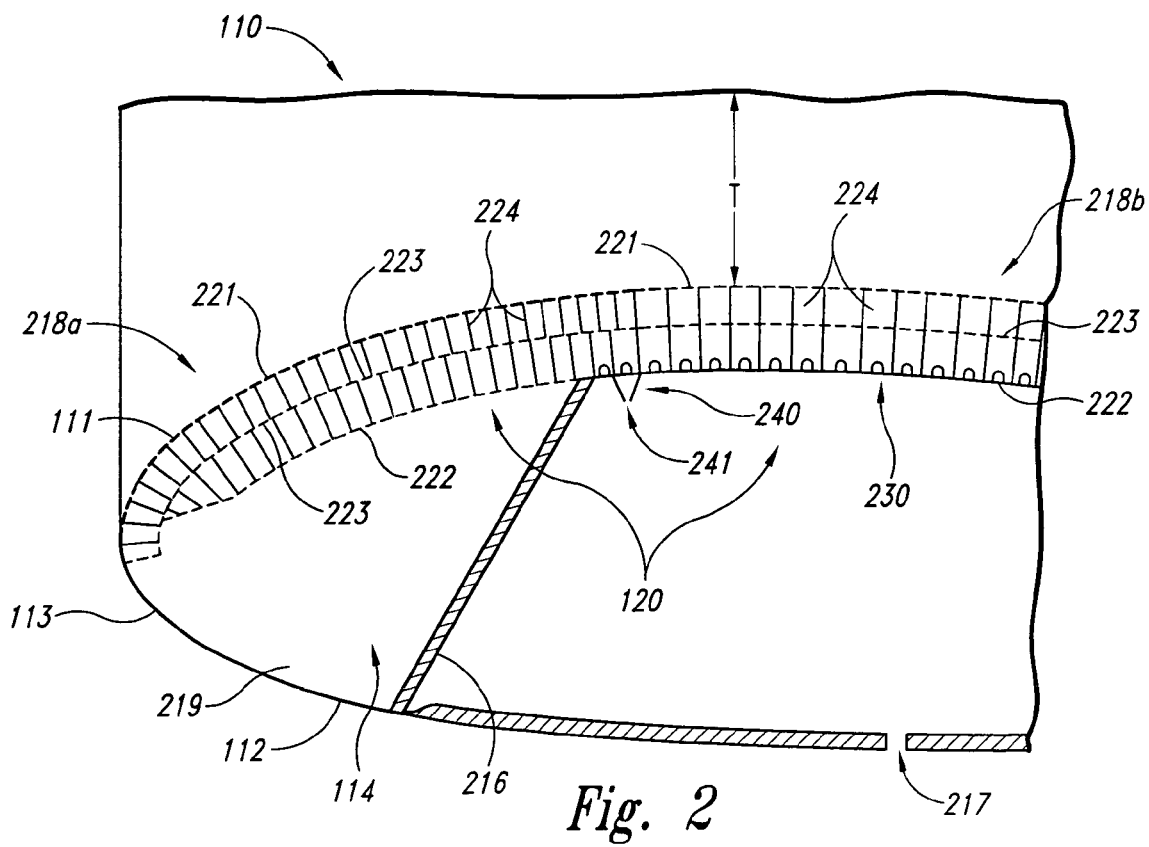
FIG. 2 is an enlarged, partially schematic illustration of a portion of the acoustic core provided in the inlet shown in FIG. 1.

FIG. 2 is a cross-sectional view of a lower portion of the inlet 110, taken generally along line 2-2 of FIG. 1. The inlet 110 includes a bulkhead 216 that separates a forward region 218a from an aft region 218b. The forward region 218a can be configured to support the ice protection system 114 and provide noise attenuation, and the aft region 218b can be configured to provide noise attenuation in the inlet 110. The core 120, which can extend over both the forward region 218a and the aft region 218b, can have different configurations in each region. For example, the core 120 in the forward region 218a can include a perforated first or face sheet 221 located at the inlet flow surface 111. The core 120 can also include a perforated second or back sheet 222 that is offset from the first sheet 221. Cells 224 are positioned between the first sheet 221 and the second sheet 222. An optional porous third sheet or septum 223 can be positioned between the first sheet 221 and the second sheet 222. When hot air is supplied to a hot air plenum 219 forward of the bulkhead 216, the hot air can pass through the cells 224 via the second sheet 222 and the third sheet 223 to heat the first sheet 221 and the adjacent air flow and prevent or restrict ice formation at the inlet flow surface 111.

The core or liner 120 in the aft region 218b can also include a first sheet 221, a second sheet 222, cells between the first and second sheets 221, 222, and an optional third sheet or septum 223 between the first and second sheets 221, 222. In the aft region 218b, the first sheet 221 is perforated and the second sheet 222 can be nonperforated. Accordingly, the cells 224 in the aft region 218b can absorb sound waves propagated in the inlet 110, without providing hot air for ice protection, which is typically not required in this region of the inlet 110.

The core 120 in the aft region 218b can also include a fluid collector passage 230 that collects water from the core 120 and provides the water to one or more exit apertures 241 (one is shown in FIG. 2 for purposes of illustration). The exit apertures 241 can be located at low points of the core 220 in the aft region 218b (e.g., one low point can be near the bulkhead 216 and the other can be aft, near the fan face of the engine 101, shown in FIG. 1). The water passes out of the core 120 via the exit aperture 241 and into a region of the nacelle 113 between the inlet flow surface 111 and the external surface 112. The water then passes out of the nacelle 113 via one or more nacelle drains 217. A flow restrictor 240 can be positioned between the core 120 and each exit aperture 241 to restrict the flow of air upwardly through the core 120 and into the inlet flow field through the porous first sheet 221. At the same time, the flow restrictor 240 can allow water to drain from the core 120 so as to at least reduce the likelihood for water to collect in the core 120 and freeze.

Figure 3A:
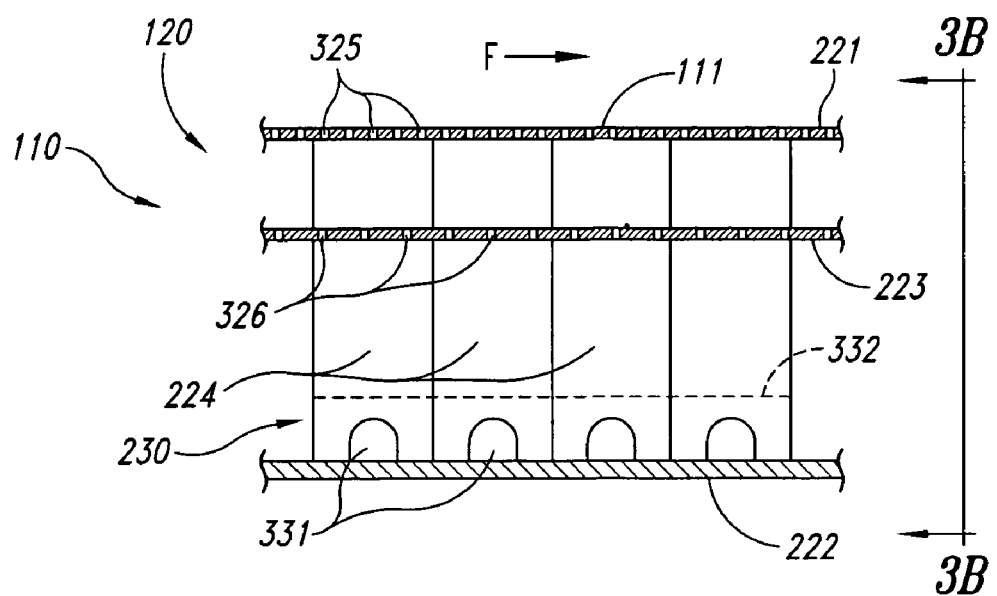
FIG. 3A is an enlarged side view of a portion of the acoustic core shown in FIG. 2.
Figure 3B:
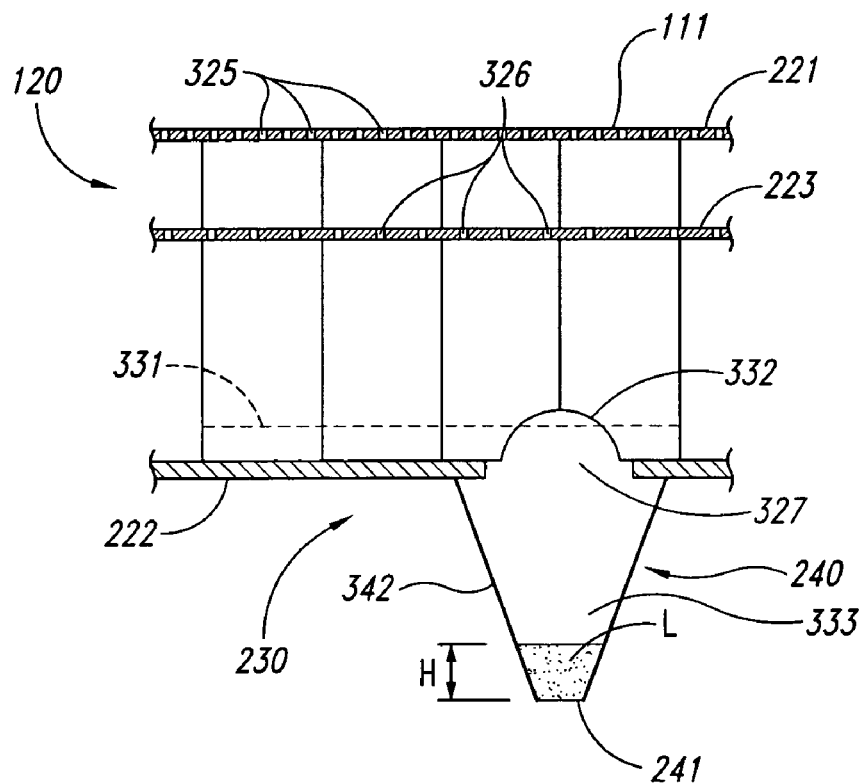
FIG. 3B is an enlarged end view of a portion of the acoustic core shown in FIG. 2.

FIG. 3A is a side view of a portion of the core 120 described above with reference to FIG. 2. FIG. 3B is an end view of a portion of the core that includes the flow restrictor 240. Referring first to FIG. 3A, the core 120 can include face sheet openings 325 in the first sheet 221, and septum openings 326 in the third sheet or septum 223. In one embodiment, the face sheet openings 325 can produce a porosity of 8% in the first sheet 221, and the septum openings 326 can produce a lower porosity (e.g., 2.3%) in the septum 223. These openings allow the transmission of acoustic signals from the inlet flow F into the cells 224. The fluid collector passage 230 can include a variety of channels, passages and/or conduits that conduct fluid through and out of the core 120. For example, the fluid collector passage can include channels extending through the walls of the cells 224. The channels can in turn include circumferential channels 331 that extend in a direction generally normal to the plane of FIG. 3A (e.g., in a circumferential direction around the inlet 110), and one or more axial channels 332 that extend axially and are coupled to the circumferential channels 331. Accordingly, water can drain through the face sheet openings 325, through the septum openings 326 and into the circumferential channels 331. The fluid can then travel circumferentially under the force of gravity to one or more axial channels 332.

Referring next to FIG. 3B, each axial channel 332 can receive water from multiple circumferential channels 331 and can direct the water to a core aperture 327 via which the water passes out of the core 120. The water can proceed through the flow restrictor 240 before exiting via the exit aperture 241. The flow restrictor 240 can include a housing 342 that has a generally conical or otherwise tapered shape, which encloses a terminal channel 333. Accordingly, the housing 342 can taper inwardly from the core aperture 327 to the relatively smaller exit aperture 241. In one aspect of this embodiment, the core aperture 327 can have a diameter of about 0.375 inch, and the exit aperture 241 can have a diameter of about 0.125 inch. Liquid, indicated by letter L, can build up within the flow restrictor 240 to a height H until it has sufficient hydrostatic pressure to pass through the exit aperture 241.

The small size of the exit aperture 241 restricts the flow of air through the flow restrictor 240 and through the core 120. Accordingly, even if the pressure at the inlet flow surface 111 falls to a value that is below the pressure level adjacent to the exit aperture 241, air will have a reduced tendency to enter the core 120 and transpire through the face sheet openings 325. In at least some embodiments, the flow resistance provided by the flow restrictor 240 can be greater than at any other point along the flow path that includes the inlet flow surface 111, the core 120 and the remainder of the fluid collector passage 230. An advantage of this arrangement is that it can reduce the likelihood for disrupting the flow F passing adjacent to the inlet flow surface 111, while still providing sound attenuation for the inlet 110. Because this arrangement can allow for a significant pressure differential between the inlet flow surface 111 and the exit aperture 241, without allowing a significant transpiration air flow through the inlet flow surface 111, the core 120 (and the associated sound attenuation it provides) can be located even in low pressure regions of the inlet 110, including the throat and lip region.

Figure 4A:
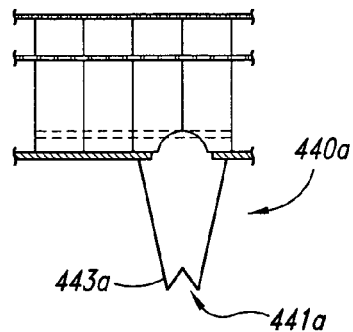
FIGS. 4A-4E illustrate flow restrictors configured in accordance with further embodiments of the invention.
Figure 4B:
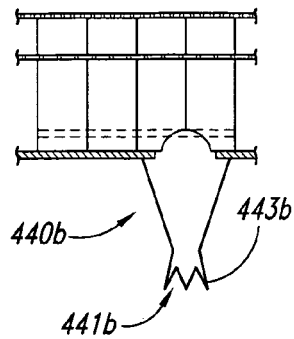
Figure 4C:
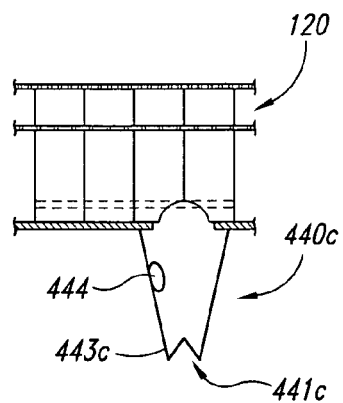

FIGS. 4A-4E illustrate flow restrictors having generally fixed geometries and configured in accordance with further embodiments of the invention. For example, a flow restrictor 440a shown in FIG. 4A includes a relatively small exit aperture 441a having a serrated aperture edge 443a. The serrated edge 443a can reduce the effect of surface tension on fluid positioned within the flow restrictor 440a, allowing the fluid to more easily pass through the exit aperture 441a. FIG. 4B illustrates a flow restrictor 440b having an exit aperture 441b surrounded by an outwardly tapered aperture edge 443b. This arrangement can also reduce surface tension between the liquid within the flow restrictor and the aperture edge 443b. FIG. 4C illustrates a flow restrictor 440c that also has an exit aperture 441c with a serrated aperture edge 443c, and further includes a pressure relief hole 444. The pressure relief hole 444 can provide for pressure relief in the event that the exit aperture 441c becomes blocked, e.g., with debris and/or frozen water. Accordingly, the pressure relief hole 444 can vent the core 120 in case the exit aperture 441c is blocked, thereby allowing some movement of air in the core 120 as the aircraft changes altitude, without compromising the acoustic suppression characteristics of the core 120. The pressure relief hole 444 can also relieve the effect of an air lock if a bubble of air becomes trapped between two bodies of liquid within the flow restrictor 440c.

Figure 4D:
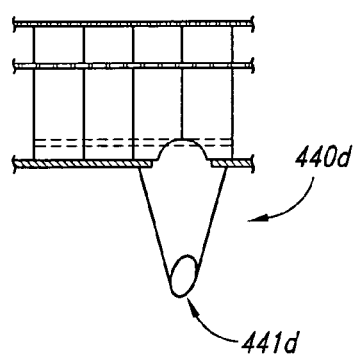
Figure 4E:
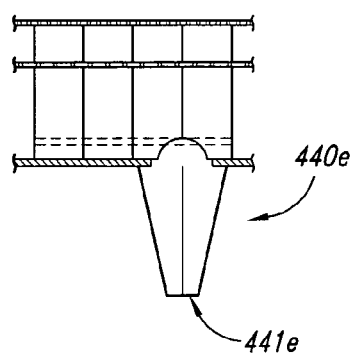

FIG. 4D illustrates a flow restrictor 440d having a scarfed, elliptical exit aperture 441d. This exit aperture 441d can also reduce the effects of surface tension between the liquid within the flow restrictor 440d and the flow restrictor walls. The flow restrictors described above can have any of a variety of cross-sectional shapes, including but not limited to, circular shapes. FIG. 4E illustrates a flow restrictor 440e having a rectangular cross-sectional shape. Accordingly, the flow restrictor 440e can include an exit aperture 441e that also has a rectangular or other corresponding non-circular shape. In other embodiments, the flow restrictors can have other cross-sectional shapes.

FIGS. 5A-5G illustrate flow restrictors having movable components in accordance with still further embodiments of the invention. The movable components allow the flow restrictors to be changed from a first configuration (e.g., a closed configuration) in which the flow of air is restricted at a first level (or prevented entirely), and a second configuration (e.g., an open configuration) in which the flow of air is restricted at a second level that is less than the first level. Beginning with FIG. 5A, a flow restrictor 540a can include a housing 542a having an exit aperture 541a surrounded by a serrated edge 543. A slideable element 545a is positioned proximate to the exit aperture 541a and is carried by a slide joint 547 so as to be slideable back and forth, as indicated by arrow S. The slideable element 545a can include a conical surface 546 that moves upwardly to seal the exit aperture 541a and prevent (or at least restrict) the flow of air into the adjacent core 120 when the pressure at the inlet flow surface 111 is less than the pressure at the exit aperture 541a. When the pressure at the exit aperture 541a decreases below the pressure at the inlet flow surface 111, the slideable element 545a can descend, allowing the liquid in the flow restrictor 540a to drain out.

FIG. 5B illustrates a flow restrictor 540b having a slideable element 545b located within a housing 542b. The slideable element 545b moves axially to seal or unseal an exit aperture 541b (also located within the housing 542b), under the influence of a pressure differential between the inlet flow surface 111 and the exit aperture 541b.

A flow restrictor 540c shown in FIG. 5C includes a flexible conduit 548 having internal protrusions 551 with inwardly facing sealing surfaces 552. As the pressure at the inlet flow surface 111 falls below the pressure outside the flow restrictor 540c, the flexible conduit 548 tends to collapse on itself, causing the sealing surfaces 552 to seal against each other and restrict or prevent air from passing through the flow restrictor 540c upwardly and into the core 120.

FIG. 5D illustrates a flow restrictor 540d having a ball-shaped sealing element 550d that rotates about a pivot joint 553 to engage or disengage with internal sealing surfaces 552 located within the flow restrictor 540d. Accordingly, when the pressure at the inlet flow surface 111 and within the core 120 decreases, the sealing element 550d can rotate upwardly to seal an exit aperture 541d located between the sealing surfaces 552. As the pressure differential between the inlet flow surface 111 and the exit aperture 541d inverts, the sealing element 540d can rotate away from the exit aperture 541d to allow water to exit the flow restrictor 540d.

FIG. 5E illustrates a flow restrictor 540e having an exit aperture 541e and a ball-shaped sealing element 550e that moves axially upwardly into engagement with the adjacent sealing surfaces 552 when the pressure at the inlet flow surface 111 is below the pressure at the exit aperture 541e. In this position, the sealing element 550e prevents or restricts the flow of air through the core 120 to the inlet flow surface 111. When the pressure differential inverts, the sealing element 550e falls downwardly into contact with the tapered walls of a corresponding housing 542e. The walls of the housing 542e can have grooves 554 that allow water to pass beyond the exit aperture 541e and out of the flow restrictor 540e when the sealing element 550e is in this position.

A flow restrictor 540f shown in FIG. 5F has an exit aperture 541f and a door 555 that pivots at a pivot joint 553 to open and close the exit aperture 541f. A spring 556 can be positioned to force the door toward its open position, thereby allowing water to exit the flow restrictor 540f. When the pressure differential across the door 555 falls below a preselected value, the door 555 overcomes the force of the spring 556 and closes the exit aperture 541f.

FIG. 5G illustrates a flow restrictor 540g having a door 555 that also pivots about a pivot joint 553 to selectively open and close a corresponding exit aperture 541g. In this particular embodiment, the door 555 can include a weight 557 that tends to close the door 555, thereby preventing transpiration flow from entering the core 120. When water builds up within the flow restrictor 540g to a point at which the weight of the water overcomes the force provided by the weight 557, the door 555 is forced open and the water drains from the flow restrictor 540g.

An advantage of the flow restrictors with movable sealing features (e.g., as described above with reference to FIGS. 5A-5G) is that they can positively seal the corresponding exit apertures. Conversely, an advantage of the fixed geometry flow restrictors (e.g., as described above with reference to FIGS. 4A-4E) is that they may be simpler to manufacture and maintain. Either type of device is expected to provide adequate protection from transpiration air flow into the inlet through the core 120.

From the foregoing, it will be appreciated that specific embodiments of the invention have been described herein for purposes of illustration, but that various modifications may be made without deviating from the invention. For example, the flow restrictors described above can have other configurations, either fixed geometry or movable geometry, that at least restrict the flow of transpiration air into and through an acoustic treatment, while allowing water to drain from the acoustic treatment. An inlet can include multiple flow restrictors, each having one or more exit apertures, and/or can include multiple nacelle drains. In some embodiments, the acoustic treatment can include features other than a core. Aspects of the invention described in the context of particular embodiments may be combined or eliminated in other embodiments. For example, the flow restrictors can include any suitable combination of the fixed geometry and movable geometry features described above. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft inlet system, comprising:
   an inlet flow surface having multiple openings;
   an acoustic treatment positioned adjacent to the inlet flow surface, the acoustic treatment having multiple cells in fluid communication with the openings in the inlet flow surface; and
   a fluid collector passage positioned to collect liquid entering the acoustic treatment through the multiple openings, the fluid collector passage having an exit aperture through which the liquid drains, the fluid collector passage including at least one flow restrictor positioned to at least restrict a flow of air from the exit aperture through the fluid collector passage to the multiple openings, wherein at least a portion of the flow restrictor is changeable between a first configuration in which the flow of air is restricted at a first level and a second configuration in the which the flow of air is unrestricted or restricted at a second level less than the first level in response to a change in a pressure difference between the inlet flow surface and the exit aperture.

2. The inlet system of claim 1 wherein the flow restrictor includes a pivotable element that rotates into a first position to restrict the flow of air at the first level when a pressure at the inlet flow surface is less than a pressure at the exit aperture, and wherein the pivotable element rotates to a second position with the flow of air unrestricted or restricted at a second level less than the first level when the pressure at the inlet flow surface is not less than a pressure at the exit aperture.

3. The inlet system of claim 1 wherein the flow restrictor includes a slideable element that is slideably positioned in a tapered, grooved channel, and wherein the slideable element slides upwardly to a first position to restrict the flow of air at the first level when a pressure at the inlet flow surface is less than a pressure at the exit aperture, and wherein the slideable element slides downwardly to a second position, with the flow of air unrestricted or restricted at a second level less than the first level when the pressure at the inlet flow surface is not less than a pressure at the exit aperture.

4. The inlet system of claim 1 wherein the flow restrictor includes a tapered portion of the fluid collector passage in which the exit opening is positioned, and wherein the exit opening has a serrated edge.

5. The inlet system of claim 1 wherein the flow restrictor includes a tapered portion of the fluid collector passage in which the exit opening is positioned, and wherein the exit opening has a canted edge.

6. The inlet system of claim 1 wherein the inlet flow surface is generally cylindrical and wherein the fluid collector passage includes:
   a plurality of first drain channels extending generally circumferentially through the acoustic treatment and around the inlet flow surface;
   at least one axially extending second drain channel in fluid communication with the first drain channels; and
   a terminal channel positioned coupled to and extending below the second drain channel, the terminal channel including the flow restrictor and the exit aperture.

7. The inlet system of claim 1 wherein the inlet flow surface is disposed around an inlet flow axis, and wherein the inlet flow surface includes a hilite and a throat region positioned aft of the hilite along the inlet flow axis, further wherein the multiple openings are positioned at least proximate to the throat.

8. The inlet system of claim 1 wherein the acoustic treatment includes a backsheet spaced apart from the inlet flow surface, and a porous septum positioned between the backsheet and the inlet flow surface.

9. The inlet system of claim 1 wherein the exit aperture is one of a plurality of exit apertures.

10. The inlet system of claim 1 wherein a flow resistance of the at least one flow restrictor is greater than a flow resistance provided by the openings in the inlet surface, the acoustic treatment and a remainder of the fluid collector passage.

11. An aircraft inlet system, comprising:
    an inlet flow surface positioned adjacent to an inlet flow path and having multiple openings;

an acoustic treatment positioned adjacent to the inlet flow surface, the acoustic treatment having multiple cells in fluid communication with the openings in the inlet flow surface;

means for collecting liquid entering the acoustic treatment through the multiple openings and directing the liquid to an exit aperture; and means for at least restricting a flow of air through the acoustic treatment and to the inlet flow path through the multiple openings in response to an increase in a pressure difference between the inlet flow surface and the exit aperture.

12. The inlet system of claim 11 wherein the means for at least restricting is changeable between a first configuration in which the flow of air is restricted at a first level and a second configuration in the which the flow of air is unrestricted or restricted at a second level less than the first level.

13. The inlet system of claim 11 wherein the means for at least restricting includes a tapered portion of a fluid collector passage and an exit opening, and wherein the exit opening has a serrated edge.

14. The inlet system of claim 11 wherein the inlet flow surface is generally cylindrical and wherein the means for collecting liquid includes:

a plurality of first drain channels extending generally circumferentially through the acoustic treatment and around the inlet flow surface;

at least one axially extending second drain channel in fluid communication with the first drain channels; and a terminal channel positioned coupled to and extending below the second drain channel, the terminal channel including the means for at least restricting.

15. A method for operating an aircraft inlet, comprising:

drawing air through an aircraft inlet to an aircraft engine;

attenuating noise in the inlet by allowing acoustic signals to pass through apertures in a surface of the inlet to an acoustic treatment;

collecting moisture from the acoustic treatment in a fluid passage;

removing the moisture through an exit aperture of the fluid passage; and in response to an increase in a pressure differential between the surface of the inlet and the exit aperture, at least restricting a flow of air from the exit aperture through the fluid passage and into the inlet through the apertures in the surface of the inlet.

16. The method of claim 15 wherein at least restricting a flow of air includes changing a configuration of a flow restrictor in the fluid passage from a first configuration to a second configuration different than the first configuration.

17. The method of claim 16 wherein changing a configuration of a flow restrictor includes pivoting an element of the flow restrictor from a first position to a second position.

18. The method of claim 16 wherein changing a configuration of a flow restrictor includes sliding an element of the flow restrictor from a first position to a second position.

19. The inlet system of claim 15 wherein the inlet flow surface is disposed around an inlet flow axis, and wherein the inlet flow surface includes a hilite and a throat region positioned aft of the hilite along the inlet flow axis, further wherein attenuating noise includes attenuating noise at the throat.

20. The method of claim 15, further comprising providing a greater resistance to the flow of air proximate to the exit aperture than at any other point along the fluid passage.

21. An aircraft inlet system, comprising:

an inlet flow surface having multiple openings;

an acoustic treatment positioned adjacent to the inlet flow surface, the acoustic treatment having multiple cells in fluid communication with the openings in the inlet flow surface; and a fluid collector passage positioned to collect liquid entering the acoustic treatment through the multiple openings, the fluid collector passage having an exit aperture through which the liquid drains, the fluid collector passage including at least one flow restrictor positioned to at least restrict a flow of air from the exit aperture through the fluid collector passage to the multiple openings, wherein the flow restrictor includes a tapered portion of the fluid collector passage in which the exit aperture is positioned, and wherein the exit aperture has a serrated edge.

22. An aircraft inlet system, comprising:

an inlet flow surface having multiple openings;

an acoustic treatment positioned adjacent to the inlet flow surface, the acoustic treatment having multiple cells in fluid communication with the openings in the inlet flow surface; and a fluid collector passage positioned to collect liquid entering the acoustic treatment through the multiple openings, the fluid collector passage having an exit aperture through which the liquid drains, the fluid collector passage including at least one flow restrictor positioned to at least restrict a flow of air from the exit aperture through the fluid collector passage to the multiple openings, wherein the flow restrictor includes a tapered portion of the fluid collector passage in which the exit aperture is positioned, and wherein the exit aperture has a canted edge.

* * * * *

UNITED STATES PATENT AND TRADEMARK OFFICE
CERTIFICATE OF CORRECTION

PATENT NO. : 7,331,421 B2 Page 1 of 1
APPLICATION NO. : 11/094916
DATED : February 19, 2008
INVENTOR(S) : Olsen et al.

It is certified that error appears in the above-identified patent and that said Letters Patent is hereby corrected as shown below:

On page 3, in field (56), under "Other Publications", in column 1, line 5, delete "vom" and insert -- com --, therefor.

On page 3, in field (56), under "Other Publications", in column 2, line 22, delete "Sensor," and insert -- Sensor --, therefor.

On page 3, in field (56), under "Other Publications", in column 2, line 41, delete "Sensor," and insert -- Sensor --, therefor.

Signed and Sealed this

Twelfth Day of August, 2008

JON W. DUDAS
*Director of the United States Patent and Trademark Office*